US010787890B2

(12) United States Patent
Moore et al.

(10) Patent No.: US 10,787,890 B2
(45) Date of Patent: Sep. 29, 2020

(54) INTEGRATED CONFIGURATION FOR A STEAM ASSISTED GRAVITY DRAINAGE CENTRAL PROCESSING FACILITY (71) Applicant: FLUOR TECHNOLOGIES CORPORATION, Sugar Land, TX (US)

(72) Inventors: Bernie Moore, Calgary (CA); Carl Barry Kopperud, Calgary (CA); Van Nguyen, Calgary (CA); Manuel Torres, Calgary (CA); Joshua Lawrence, Calgary (CA)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 16/165,240

(22) Filed: Oct. 19, 2018

(65) Prior Publication Data
US 2019/0120033 A1   Apr. 25, 2019

Related U.S. Application Data (60) Provisional application No. 62/575,209, filed on Oct. 20, 2017.

(51) Int. Cl.
*E21B 43/40*   (2006.01)
*E04H 1/00*   (2006.01)
(Continued)

(52) U.S. Cl.
CPC ............ *E21B 43/2406* (2013.01); *C02F 9/00* (2013.01); *C10G 1/047* (2013.01); *E04H 1/005* (2013.01);
(Continued)

(58) Field of Classification Search
CPC ...... E21B 43/2406; E21B 43/40; E21B 1/005; C02F 9/00; C02F 1/048; C02F 1/40;
(Continued)

(56) References Cited

U.S. PATENT DOCUMENTS 2,724,938 A   11/1955 Harry et al.
3,274,745 A   9/1966 Mcmanus et al.
(Continued)

FOREIGN PATENT DOCUMENTS

AU   2010330872 A1   7/2012
AU   2014202657 A1   6/2014
(Continued)

OTHER PUBLICATIONS

Notice of Allowance dated Jun. 13, 2019, U.S. Appl. No. 14/727,727, filed Jun. 23, 2015.
(Continued)

*Primary Examiner* — Silvana C Runyan
(74) *Attorney, Agent, or Firm* — Conley Rose, PC (57) ABSTRACT A steam assisted gravity drainage (SAGD) processing facility comprising: an oil/water separation process block operable for bulk separation of produced water from a produced fluid comprising produced water and hydrocarbons; a de-oiling process block operable to remove residual oil from the produced water separated from the produced fluid in the oil/water separation process block and provide a de-oiled water; a water treatment block operable to remove contaminants from the de-oiled water and provide a treated water; and a steam generation process block operable to produce steam from the treated water. In embodiments, each of the oil/water separation process block, the de-oiling process block, the water treatment process block, and the steam generation process block is modularized and comprises a (Continued)

plurality of modules. Methods for operating and assembling a SAGD processing facility are also provided.

25 Claims, 5 Drawing Sheets

(51) Int. Cl.
*E21B 43/24* (2006.01)
*C10G 1/04* (2006.01)
*C02F 9/00* (2006.01)
*C02F 103/10* (2006.01)
*C02F 101/32* (2006.01)
*C02F 1/04* (2006.01)
*C02F 1/40* (2006.01)
*C02F 1/24* (2006.01)
*C02F 1/42* (2006.01)

(52) U.S. Cl.
CPC .............. *E21B 43/40* (2013.01); *C02F 1/048* (2013.01); *C02F 1/24* (2013.01); *C02F 1/40* (2013.01); *C02F 1/42* (2013.01); *C02F 2101/32* (2013.01); *C02F 2103/10* (2013.01); *C02F 2201/007* (2013.01)

(58) Field of Classification Search
CPC .... C02F 1/42; C02F 2101/32; C02F 2103/10; C02F 2201/007; C10G 1/047; E04H 1/005; E04H 5/02
See application file for complete search history.

(56) References Cited

U.S. PATENT DOCUMENTS

| | | | |
|---|---|---|---|
| 3,643,389 A | 2/1972 | Sheppley et al. | |
| 3,707,165 A | 12/1972 | Stahl et al. | |
| 3,925,679 A | 12/1975 | Berman et al. | |
| 4,055,050 A | 10/1977 | Kozlov | |
| RE302,820 | 5/1980 | Berman et al. | |
| 4,267,822 A | 5/1981 | Diamond | |
| 4,452,312 A | 6/1984 | Roblin | |
| 4,457,116 A | 7/1984 | Kump | |
| 4,527,981 A | 7/1985 | Chisum | |
| 5,474,411 A | 12/1995 | Schoenfeld et al. | |
| 6,116,050 A | 9/2000 | Yao et al. | |
| 6,176,046 B1 | 1/2001 | Quine et al. | |
| 6,308,465 B1 | 10/2001 | Galloway et al. | |
| 6,581,698 B1 | 6/2003 | Dirks | |
| 6,715,450 B1* | 4/2004 | Wittchow | F22B 21/346 122/1 B |
| 6,751,984 B2 | 6/2004 | Neeraas et al. | |
| 6,786,051 B2 | 9/2004 | Kristich et al. | |
| 6,862,487 B2 | 3/2005 | Yamanaka et al. | |
| 7,216,507 B2 | 5/2007 | Cuellar et al. | |
| 8,070,389 B2 | 12/2011 | Ayers et al. | |
| 8,097,451 B2 | 1/2012 | Gaalswyk | |
| 8,151,537 B2 | 4/2012 | Pope | |
| 8,157,003 B2 | 4/2012 | Hackett et al. | |
| 8,535,419 B2 | 9/2013 | Wind et al. | |
| 8,621,786 B2 | 1/2014 | Lam | |
| 8,671,625 B2 | 3/2014 | Imaoka et al. | |
| 8,931,217 B2 | 1/2015 | Haney et al. | |
| 9,376,828 B2 | 6/2016 | Haney et al. | |
| 10,458,140 B2 | 10/2019 | Haney et al. | |
| 2003/0127226 A1* | 7/2003 | Heins | C02F 1/04 166/303 |
| 2005/0241823 A1 | 11/2005 | Beato et al. | |
| 2006/0124354 A1 | 6/2006 | Witte | |
| 2007/0051513 A1* | 3/2007 | Heins | E21B 43/24 166/265 |
| 2008/0000644 A1 | 1/2008 | Tsilevich | |
| 2008/0029447 A1 | 2/2008 | Gaalswyk | |
| 2008/0127662 A1 | 6/2008 | Stanfield et al. | |
| 2010/0132390 A1 | 6/2010 | Platt et al. | |
| 2011/0146164 A1 | 6/2011 | Haney et al. | |
| 2012/0193093 A1 | 8/2012 | James | |
| 2013/0066772 A1 | 3/2013 | Xiong | |
| 2013/0067721 A1 | 3/2013 | Scannon et al. | |
| 2013/0313886 A1 | 11/2013 | Van Der Merwe et al. | |
| 2014/0018589 A1 | 1/2014 | Iyer et al. | |
| 2014/0053599 A1 | 2/2014 | Byfield | |
| 2014/0335566 A1 | 11/2014 | Guerini et al. | |
| 2015/0210610 A1 | 7/2015 | Rafique et al. | |
| 2015/0292223 A1 | 10/2015 | Haney et al. | |
| 2017/0159305 A1 | 6/2017 | Haney et al. | |
| 2017/0216766 A1 | 8/2017 | Mogose et al. | |
| 2018/0220552 A1 | 8/2018 | Arcot et al. | |

FOREIGN PATENT DOCUMENTS

| | | |
|---|---|---|
| BR | 112012014815-0 | 1/2020 |
| CA | 2596139 A1 | 2/2008 |
| CA | 2724938 A1 | 6/2011 |
| CA | 3021456 A1 | 4/2019 |
| EP | 0006015 A1 | 12/1979 |
| EP | 2516759 A1 | 10/2012 |
| EP | 3419761 A1 | 1/2019 |
| IN | 336414 | 5/2020 |
| WO | 2003031012 | 4/2003 |
| WO | 2006055953 A1 | 5/2006 |
| WO | 2011075625 A1 | 6/2011 |
| WO | 2012100320 A1 | 8/2012 |
| WO | 2017147405 A1 | 8/2017 |
| WO | 2018144204 A1 | 8/2018 |
| WO | 2019089694 A1 | 5/2019 |

OTHER PUBLICATIONS

Notice of Allowance dated Jun. 6, 2019, U.S. Appl. No. 14/727,727, filed Jun. 23, 2015.
Advisory Action dated Apr. 30, 2019, U.S. Appl. No. 15/440,812, filed Feb. 23, 2017.
Office Action dated May 31, 2019, U.S. Appl. No. 15/440,812, filed Feb. 23, 2017.
European Application No. 17757290.6, Communication pursuant to Rules 161(2) and 162 EPC dated Oct. 5, 2018, 3 pages.
Office Action dated Feb. 25, 2019, U.S. Appl. No. 15/420,965, filed Jan. 31, 2017.
Final Office Action dated Nov. 29, 2019, U.S. Appl. No. 15/440,812, filed Feb. 23, 2017.
European Extended Search Report dated Sep. 30, 2019, European Application No. 17757290.6 filed Feb. 24, 2017.
Communication pursuant to Rules 70(2) and 70a(2) EPC dated Oct. 18, 2019, European Application No. 17757290.6 filed Feb. 24, 2017.
Office Action dated Sep. 3, 2019, U.S. Appl. No. 15/420,965, filed Jan. 31, 2017.
Office Action dated Jun. 14, 2019, Chinese Patent Application No. 201710094489.7 filed Dec. 17, 2010.
International Preliminary Report on Patentability dated Aug. 15, 2019, International Application No. PCT/US2018/013346 filed Jan. 11, 2018.
EPO Communication under Rule 71(3), dated Sep. 6, 2019, European Patent Application No. 10838282.1 filed Dec. 18, 2009.
Office Action dated Jul. 20, 2012, U.S. Appl. No. 12/791,365, filed Dec. 17, 2010, 14 pages.
Final Office Action dated Feb. 21, 2012, U.S. Appl. No. 12/791,365, filed Dec. 17, 2010, 12 pages.
Office Action dated Apr. 3, 2013, U.S. Appl. No. 12/791,365, filed Dec. 17, 2010, 13 pages.
Final Office Action dated Aug. 23, 2013, U.S. Appl. No. 12/791,365, filed Dec. 17, 2010, 13 pages.
Advisory Action dated Nov. 4, 2013, U.S. Appl. No. 12/791,365, filed Dec. 17, 2010, 3 pages.
Office Action dated Jan. 16, 2014, U.S. Appl. No. 12/791,365, filed Dec. 17, 2010, 11 pages.

(56) References Cited

OTHER PUBLICATIONS

Final Office Action dated May 22, 2014, U.S. Appl. No. 12/791,365, filed dec. 17, 2010, 9 pages.
Advisory Action dated Aug. 7, 2014, U.S. Appl. No. 12/791,365, filed Dec. 17, 2010, 2 pages.
Notice of Allowance dated Sep. 11, 2014, U.S. Appl. No. 12/791,365, filed Dec. 17, 2010, 10 pages.
Office Action dated Oct. 8, 2015, U.S. Appl. No. 14/527,425, filed Oct. 29, 2014, 12 pages.
Notice of Allowance dated Jan. 29, 2016, U.S. Appl. No. 14/527,425, filed Oct. 29, 2014, 7 pages.
Office Action dated Jan. 22, 2016, U.S. Appl. No. 14/747,727, filed Jun. 23, 2015, 11 pages.
Final Office Action dated Jun. 14, 2016, U.S. Appl. No. 14/747,727, filed Jun. 23, 2015, 11 pages.
Advisory Action dated Sep. 6, 2016, U.S. Appl. No. 14/747,727, filed Jun. 23, 2015, 11 pages.
Office Action dated Dec. 7, 2016, U.S. Appl. No. 14/747,727, filed Jun. 23, 2015, 12 pages.
Final Office Action dated Apr. 18, 2017, U.S. Appl. No. 14/727,727, filed Jun. 23, 2015, 22 pages.
Advisory Action dated Jul. 3, 2017, U.S. Appl. No. 14/727,727, filed Jun. 23, 2015, 22 pages.
Restriction Requirement dated Aug. 3, 2018, U.S. Appl. No. 15/440,812, filed Feb. 23, 2017.
Office Action dated Oct. 18, 2018, U.S. Appl. No. 15/440,812, filed Feb. 23, 2017.
Final Office Action dated Feb. 7, 2019, U.S. Appl. No. 15/440,812, filed Feb. 23, 2017.
Intellectual Property India, Government of India, Examination Report dated Feb. 28, 2018, 5 pages.
International Patent Application No. PCT/US2010/060969, International Search Report dated Mar. 7, 2011, 2 pages.
International Patent Application No. PCT/US2010/060969, Written Opinion of the International Searching Authority dated Mar. 7, 2011, 4 pages.
International Patent Application No. PCT/US2010/060969, International Preliminary Report on Patentability dated Jun. 19, 2012, 5 pages.
International Application No. PCT/US2017/019329, International Search Report, dated May 22, 2017, 3 pages.
International Application No. PCT/US2017/019329, Written Opinion of the International Searching Authority, dated May 22, 2017, 7 pages.
International Application No. PCT/US2018/013346, Search Report and Written Opinion dated Apr. 25, 2018.
International Patent Application No. PCT/US2017/019329, International Preliminary Report on Patentability dated Sep. 7, 2018, 9 pages.
International Application No. PCT/US18/58358, International Search Report & Written Opinion, dated Jan. 16, 2019, 9 pages.
GCC Patent Application No. 2010/17384, Examination Report dated May 7, 2014, 5 pages.
GCC Patent Application No. 2010/17384, Examination Report dated Aug. 27, 2014, 4 pages.
Canada Patent Application No. 2,724,938, Office Action dated Jun. 10, 2013, 3 pages.
Canada Patent Application No. 2,724,938, Office Action dated Jan. 30, 2014, 4 pages.
Canada Patent Application No. 2,724,938, Notice of Allowance dated Oct. 22, 2014, 1 page.
Canada Patent Application No. 2,724,938, Office Action dated May 12, 2015, 4 pages.
Canada Patent Application No. 2,724,938, Office Action dated Mar. 2, 2016, 3 pages.
Canada Patent Application No. 2,724,938, Notice of Allowance dated Dec. 16, 2016, 1 page.
Australia Patent Application No. 2010330872, Examination Report No. 1 dated Nov. 1, 2013, 3 pages.
Australia Patent Application No. 2010330872, Notice of Acceptance dated Apr. 10, 2014, 10 pages.
Philippines Patent Application No. 12012501218, Examination Report dated Jul. 26, 2013, 1 page.
Philippines Patent Application No. 12012501218, Examination Report dated Sep. 18, 2014, 4 pages.
Philippines Patent Application No. 12012501218, Examination Report dated Feb. 2, 2015, 3 pages.
Mexico Patent Application No. MX/A/2012/007092, Translation of Office Action, dated Nov. 6, 2014, 2 pages.
Mexico Patent Application No. MX/A/2012/007092, Translation of Office Action, dated Jun. 24, 2015, 2 pages.
Europe Patent Application No. 10838282.1, Invitation Pursuant to Rule 62a(1) EPC, dated Jun. 6, 2014, 2 pages.
Europe Patent Application No. 10838282.1, Search Report and Written Opinion, dated Oct. 6, 2014, 8 pages.
Europe Patent Application No. 10838282.1, Examination Report, dated Sep. 23, 2016, 4 pages.
China Patent Application No. 201080064231.9, Office Action, dated Jan. 27, 2014, 17 pages.
China Patent Application No. 201080064231.9, Office Action, dated Sep. 19, 2014, 16 pages.
China Patent Application No. 201080064231.9, Decision on Rejection, dated May 6, 2015, 20 pages.
China Patent Application No. 201080064231.9, Notice of Reexamination, dated Apr. 6, 2016, 15 pages.
China Patent Application No. 201080064231.9, Reexamination Decision, dated Nov. 22, 2016, 26 pages.
Chinese Patent Application No. 201710094489.7, Search Report dated Sep. 18, 2018, 3 pages.
Chinese Patent Application No. 201710094489.7, Office Action dated Sep. 28, 2018, 17 pages.
Australia Patent Application No. 2014202657, Examination Report No. 1, dated Jun. 19, 2015, 2 pages.
Australia Patent Application No. 2014202657, Examination Report No. 2, dated Jun. 14, 2016, 4 pages.
Australia Patent Application No. 2014202657, Notice of Acceptance, dated Jun. 28, 2016, 2 pages.
Indonesian Patent Application No. WO0201202728, Office Action dated Dec. 17, 2018, 2 pages.
International Application No. PCT/US18/58358, International Search Report, dated Jan. 16, 2019, 9 pages.
Haney, Fred, et al., entitled "Modular Processing Facility", filed Dec. 18, 2009, U.S. Appl. No. 61/287,956.
Moore, Bernie, et al., entitled, "Integrated Configuration for a Steam Assisted Gravity Drainage Central Processing Facility," filed Oct. 20, 2017, U.S. Appl. No. 62/575,209.
Shenoy, Arkal et al., "Modular Helium Reactor (MHR) for Oil Sands Extraction", General Atomics, 3550 General Atomics Court, San Diego, CA 92121, 2 pages, [retrieved on Jan. 26, 2017]. Retrieved from Internet: <URL: https://cns-snc.ca/media/past_conferences/CNS2009/proposals/Arkal%20Shenoy%20Proposal.pdf>.
Brazilian Patent Application No. BR112012014815-0, Office Action dated Dec. 24, 2018, 7 pages.
Notice of Hearing dated Feb. 11, 2020, Indian Patent Application No. 5322/DELNP/2012 filed Dec. 17, 2010.
Office Action dated Dec. 11, 2019, Chinese Patent Application No. 201710094489.7, filed Dec. 17, 2010.
International Preliminary Report on Patentability dated May 14, 2020, International Application No. PCT/US2018/058358 filed Oct. 31, 2028.

\* cited by examiner

INTEGRATED CONFIGURATION FOR A STEAM ASSISTED GRAVITY DRAINAGE CENTRAL PROCESSING FACILITY

CROSS-REFERENCE TO RELATED APPLICATIONS

This application claims priority to U.S. Provisional Patent Application No. 62/575,209, filed Oct. 20, 2017 and entitled "Integrated Configuration for a Steam Assisted Gravity Drainage Central Processing Facility", the disclosure of which is hereby incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to a steam assisted gravity drainage (SAGD) processing facility; more particularly, this disclosure relates to a SAGD processing facility comprising mechanical vapor recompression (MVR) evaporation and conventional steam generation; still more particularly, this disclosure relates to a modularized SAGD processing facility.

BACKGROUND

Steam Assisted Gravity Drainage (SAGD) is a thermal process for production of bitumen from oil sands reservoirs. The process involves injecting high pressure, saturated steam into the oil sands reservoir, which, upon contact with the colder oil sand, condenses to water, thus releasing thermal energy. The released thermal energy heats and mobilizes the bitumen, so that it can be produced to the surface. The thermal heating of the bitumen produces a small amount of non-condensable gas. At the surface, the stream of bitumen, the condensed water, and produced gas are sent to a Central Processing Facility (CPF), also referred to herein as a 'SAGD processing facility', where the bitumen and water are separated, and the separated water is treated and heated to produce high pressure steam, which is sent back to the reservoir.

SUMMARY

Herein disclosed is a steam assisted gravity drainage (SAGD) processing facility comprising: an oil/water separation process block operable for bulk separation of produced water from a produced fluid comprising produced water and hydrocarbons, wherein the oil/water separation process block comprises an inlet for the produced fluid and an outlet for the produced water separated from the produced fluid; a de-oiling process block operable to remove residual oil from the produced water separated from the produced fluid in the oil/water separation process block and provide a de-oiled water, wherein the de-oiling process block comprises an inlet for the produced water from the oil/water separation block and an outlet for the de-oiled water; a water treatment block operable to remove contaminants from the de-oiled water and provide a treated water, wherein the water treatment process block comprises an inlet for the de-oiled water and an outlet for the treated water; and a steam generation process block operable to produce steam from the treated water, wherein the steam generation process block comprises an inlet for the treated water and an outlet for steam, wherein: each of the oil/water separation process block, the de-oiling process block, the water treatment process block, and the steam generation process block is modularized and comprises a plurality of modules; the de-oiling process block comprises a compact flotation unit, the water treatment process block comprises a mechanical vapor recompression evaporation apparatus, the steam generation process block does not comprise a once through steam generator (OTSG), or a combination thereof; the SAGD processing facility comprises no pressure reduction apparatus, no temperature reduction apparatus, or both no pressure reduction apparatus and no temperature reduction apparatus to reduce the pressure or the temperature, respectively, of the produced water separated from the produced fluid in the oil/water separation process block prior to introduction of the separated produced water into the de-oiling process block; or a combination thereof.

Also disclosed herein is a method for operating a steam assisted gravity drainage processing facility, the method comprising: effecting bulk separation of produced water from a produced fluid comprising the produced water and hydrocarbons; removing residual oil from the produced water to provide a de-oiled water; removing contaminants from the de-oiled water to provide a treated water; and generating steam from the treated water, wherein: each of the effecting bulk separation, the removing residual oil, the removing contaminants, and the generating steam is performed via a plurality of modules; the removing residual oil from the produced water is effected via compact flotation, the removing contaminants from the de-oiled water is effected via mechanical vapor recompression evaporation, the generating steam from the treated water is not effected via a once through steam generator (OTSG), or a combination thereof; the temperature, the pressure, or both the temperature and the pressure of the produced water separated from the produced fluid via the bulk separation is not reduced prior to removing residual oil from the produced water; or a combination thereof.

Further disclosed herein is a method for assembling a steam assisted gravity drainage (SAGD) processing facility, the method comprising: providing a plurality of modules for each of a number of process blocks including: an oil/water separation process block (a) operable for bulk separation of produced water from a produced fluid comprising the produced water and hydrocarbons, wherein the oil/water separation process block comprises an inlet for the produced fluid and an outlet for the produced water separated from the produced fluid; a de-oiling process block (b) operable to remove residual oil from the produced water separated from the produced fluid in the oil/water separation process block and provide a de-oiled water, wherein the de-oiling process block comprises an inlet for the produced water from the oil/water separation block and an outlet for de-oiled water; a water treatment block (c) operable to remove contaminants from the de-oiled water and provide a treated water, wherein the water treatment process block comprises an inlet for the de-oiled water and an outlet for the treated water; and a steam generation process block (d) operable to produce steam from the treated water, wherein the steam generation process block comprises an inlet for the treated water and an outlet for steam, wherein each process block (a), (b), (c), and (d) includes an electrical and instrumentation (E&I) room on at least one of the plurality of modules for that process block; interconnecting the plurality of modules within process blocks (a), (b), (c), and (d); connecting process blocks (a) and (b), (b) and (c), and (c) and (d); and connecting each E&I room with a central control room and a main electrical supply.

Also disclosed herein is a steam assisted gravity drainage (SAGD) processing facility comprising: an oil/water separation process block operable for bulk separation of produced water from a produced fluid comprising the produced water and hydrocarbons, wherein the oil/water separation process block comprises an inlet for the produced fluid and an outlet for the produced water separated from the produced fluid; a de-oiling process block operable to remove residual oil from the produced water removed from the oil/water separation process block and provide a de-oiled water, wherein the de-oiling process block comprises a compact flotation unit comprising an inlet for the produced water from the oil/water separation block and an outlet for the de-oiled water; a water treatment block operable to remove contaminants from the de-oiled water and provide a treated water, wherein the water treatment process block comprises mechanical vapor recompression evaporation apparatus comprising an inlet for the de-oiled water and an outlet for the treated water; and a steam generation process block operable to produce steam from the treated water, wherein the steam generation process block comprises a boiler comprising an inlet for the treated water and an outlet for steam, wherein each of the oil/water separation process block, the de-oiling process block, the water treatment process block, and the steam generation process block is modularized and comprises a plurality of modules.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," "in some embodiments," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Figure 1:
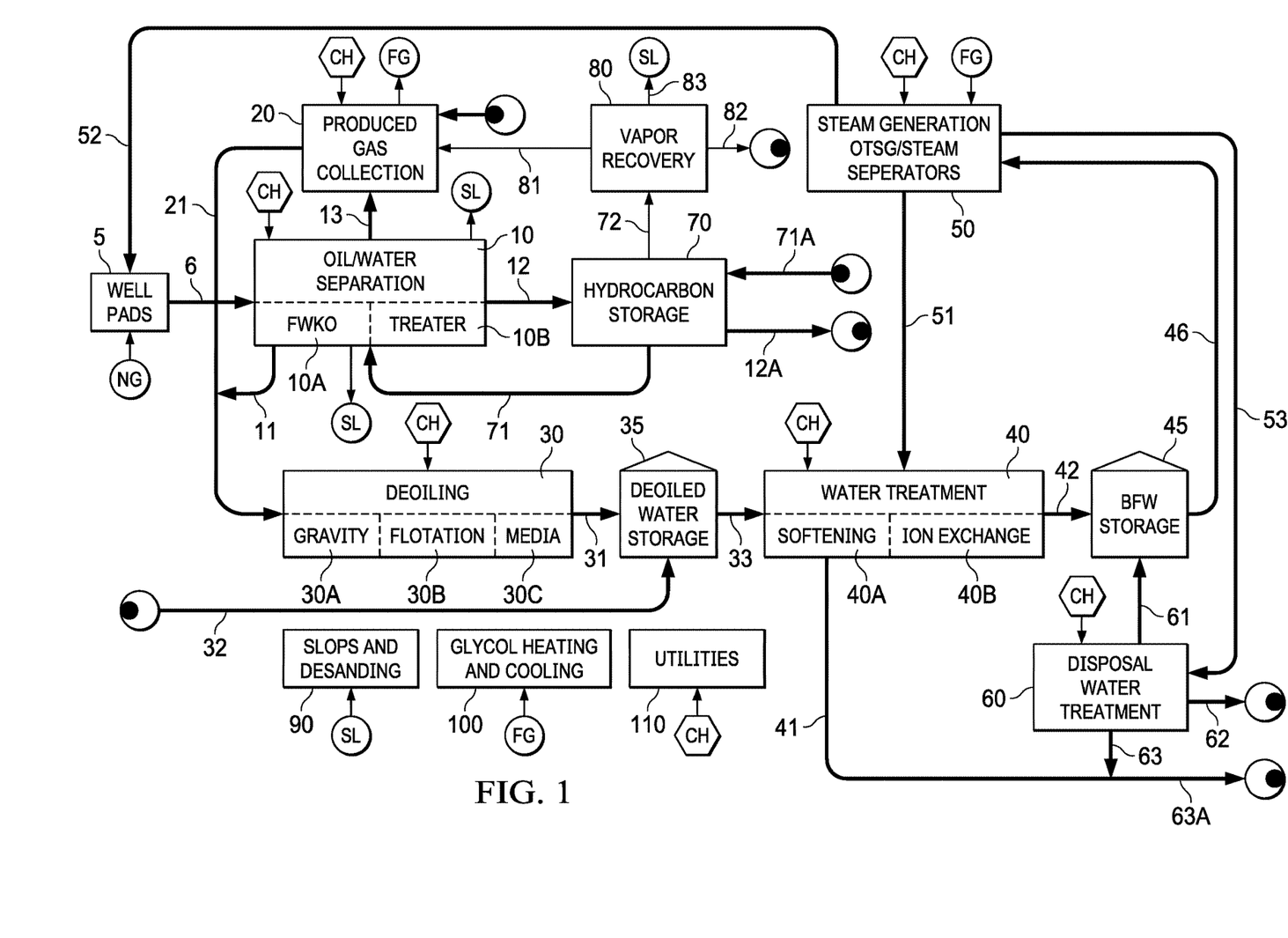
FIG. 1 is a schematic of a typical steam assisted gravity drainage (SAGD) processing facility I.

SAGD processing will now be described briefly to facilitate description of the herein-disclosed SAGD processing herein below. A typical SAGD process is shown in FIG. 1, which is a schematic of a typical steam assisted gravity drainage (SAGD) processing facility I. At the CPF, there may be a number of main processing steps or blocks. For example, the SAGD processing may comprise an oil/water separation step or block 10, a de-oiling step or block 30, a water treatment step or block 40, and a steam generation step or block 50. The CPF may further comprise a produced gas collection step or block 20, a disposal water treatment step or block 60, a hydrocarbon storage step or block 70, a vapor recovery step or block 80, a slops and de-sanding step or block 90, a glycol heating and cooling step or block 100, and/or a utilities step or block 110. These processing steps or blocks will be described in more detail herein below, and may be referred to simply as blocks. The blocks can comprise one or more apparatus for carrying out the step.

At oil/water separation block 10, bulk separation of produced water from produced well pad 5 (which can be an emulsion comprising oil, water, gas, and/or entrained solids) is effected. For example, in some embodiments, a light hydrocarbon diluent, such as naphtha or condensate, may be added to the produced fluid stream line 6, comprising oil (e.g., bitumen) and water, from well pads 5 to reduce the density and viscosity of the oil phase such that it floats on water and therefore can be separated via traditional gravity separation techniques. Oil/water separation 10 can comprise a first oil/water separation 10A and a second oil/water separation 10B. First oil/water separation 10A can comprise free water knockout (FWKO) and second oil/water separation 10B can comprise an oil/water treater, such as a gravity separator. In some embodiments, diluent is routed via diluent line 71 from hydrocarbon storage 70, which is described further herein below. Separated oil may be introduced into hydrocarbon storage 70 via produced oil line 12. Produced water may be removed from oil/water separation 10 via produced water line 11. Produced gas removed from the emulsion in oil/water separation 10 can be introduced into produced gas collection step or block 20 via produced gas line 13. As indicated in the embodiment of FIG. 1, chemicals (CH), such as demulsifiers, surfactants, and the like can be utilized in oil/water separation 10, and slop liquids (SL), including de-sand fluid and a rag layer, may be removed from oil/water separation 10, and introduced into slops and de-sanding block 90, which is described further herein below.

The SAGD processing may comprise a de-oiling step or block 30, in which the produced water from the oil/water separation step or block 10 in produced water line 11 may be processed to remove residual oil down to minimum levels required by the downstream processing steps, thus providing a de-oiled water in line 31. As depicted in the embodiment of FIG. 1, chemicals (CH), such as demulsifiers, surfactants, flocculants, and the like, may also be introduced into de-oiling 30. As depicted in the embodiment of FIG. 1, de-oiling 30 is traditionally performed in a three step process, each step of which (e.g., gravity separation 30A, flotation 30B, and media filtration 30C) is conventionally operated at atmospheric conditions, requiring the produced water to be cooled to below 100° C. The first step 30A is typically gravity separation, the second step 30B typically includes gas flotation, in which gas may be injected into the water to enhance oil separation, and the third step 30C typically includes conventional media filtration. In some embodiments, condensed liquids from a produced gas separator in produced gas collection step or block 20 (described further herein below) may also be introduced into de-oiling step or block 30 via condensed liquids line 21. De-oiled water may be removed from de-oiling block 30 via de-oiled water line 31. In some embodiments, de-oiled water may be stored in a de-oiled water storage step, apparatus, or block 35, and make-up water introduced thereto, as necessary, via make-up water line 32.

As noted above, the SAGD processing may comprise a water treatment step or block 40, in which the de-oiled water obtained from de-oiling step or block 30 (via de-oiled water line 31) or from de-oiled water storage step or block 35 (via stored de-oiled water line 33) may be further treated to remove contaminants down to minimum levels required by the downstream steam generation process. Typically, the water treatment is a two stage process, including a softening step 40A in which chemicals (CH), such as lime and magnesium oxide, may be used for silica removal, and a conventional ion exchanger step 40B to remove hardness. Steam generation blowdown from steam generation step or block 50 (described further herein below) may be introduced into water treatment 40 via steam generation blowdown line 51. Treated water may be removed from water treatment step or block 40 via treated water line 42. Lime sludge solids may be removed from water treatment step or block 40 via lime sludge line 41 and sent for disposal via solids disposal line 63A. In some embodiments, treated water may be stored in a boiler feed water (BFW) storage step, apparatus, or block 45.

As noted hereinabove, the SAGD processing may comprise a steam generation step or block 50, in which the treated water (from water treatment step or block 40 via treated water line 42 or from BFW storage 45 via stored, treated water line 46) may be used as boiler feed water (BFW) to produce high pressure, saturated injection steam. As depicted in the embodiment of FIG. 1, chemicals (CH), such as, without limitation, dispersant, phosphate, neutralizing amine, filming amine, oxygen scavenger, and fuel gas (FG), may also be introduced into and utilized by steam generation 50. The type of steam generator used depends on the BFW quality. Conventionally, BFW from the softening/ion-exchange process 40A/40B (of the water treatment step or block 40) may not meet industry norms for use of conventional steam generators. Therefore, once through steam generators (OTSGs) may be required. OTSGs only produce nominally 75-80% steam quality at the discharge (within block 50, e.g., in high pressure steam outlet line 52), requiring that the residual hot water stream at the steam generation discharge (e.g., about 20-25% of the total BFW flow) be recycled within the overall process. For example, in the embodiment of FIG. 1, a portion of the steam generator blowdown is recycled via steam generator blowdown line 51 to water treatment 40 and another portion of the steam generator blowdown is sent to disposal water treatment step or block 60 (also referred to as disposal water Reduced Liquid Discharge (RLD) treatment step or block 60) via steam generator blowdown line 53. In embodiments, the disposal water treatment step or block 60 concentrates blowdown using steam or mechanical vapor recompression to evaporate a portion of the influent water. As depicted in FIG. 1, the high pressure steam in high pressure steam line 52 from steam generation 50 is reintroduced into well pads 5 for further bitumen extraction via SAGD.

The SAGD processing may further comprise a disposal water treatment step or block 60, in which the blowdown from the steam generation step or block 50 may be processed to recover water to meet regulatory requirements for water usage. Chemicals (CH), such as caustic, sulfuric acid, hydrochloric acid, and chelant, may also be introduced into disposal water treatment 60, as depicted in the embodiment of FIG. 1. When OTSGs are utilized for the steam generation step 50, the steam generator blowdown may be sent to the disposal water treatment unit of disposal water treatment step or block 60 (e.g., via steam generator blowdown line 53), where it may be concentrated (e.g., via an MVR process), producing a solids stream in solids disposal line 63 and/or a concentrated water stream in concentrated disposal brine line 62, which may be sent offsite for disposal. For example, lime sludge solids in lime sludge solids line 41 from water treatment 40 and disposal solids in solids disposal line 63 may be combined and sent for disposal via solids disposal line 63A. Recovered water may be recycled via recovered water line 61, for example, to BFW storage 45. As mentioned hereinabove, the SAGD processing may further comprise hydrocarbon storage step, apparatus, or block 70, wherein diluent from a pipeline in pipeline diluent line 71A and separated hydrocarbons in separated hydrocarbon line 12 from oil/water separation 10 can be stored. Recovered hydrocarbons can be sent offsite via line 12A from hydrocarbon storage 70, for example, to a pipeline for sale. A portion of the diluent in hydrocarbon storage 70 can be introduced into oil/water separation 10 via diluent line 71, and hydrocarbons separated from produced water and gas in oil/water separation 10 can be introduced into hydrocarbon storage 70 via separated hydrocarbon line 12. Offgas from hydrocarbon storage 70 can be recovered, via offgas line 72, by vapor recovery step, apparatus, or block 80.

As mentioned hereinabove, the SAGD processing may further comprise vapor recovery step, apparatus, or block 80, wherein offgas from hydrocarbon storage 70 is processed into hydrocarbon vapor in hydrocarbon vapor line 81, flare gas in flare gas line 82, and/or recovered liquids in recovered liquids line 83. The hydrocarbon vapor in hydrocarbon vapor line 81 can, in some embodiments, be introduced into produced gas collection step, apparatus, or block 20. The flare gas in flare gas line 82 is sent to flare for disposal. The recovered liquids in recovered liquids line 83 can, in some embodiments, be sent to slops and de-sanding step, apparatus, or block 90.

As mentioned hereinabove, the SAGD processing facility may further comprise produced gas collection or handling step, apparatus, or block 20, wherein a gas separator may be utilized to separate condensed liquids from the gas introduced into produced gas collection 20. Hydrocarbon vapor in hydrocarbon vapor line 81, natural gas (NG) from a pipeline, and/or produced gas in produced gas line 13 can be introduced into produced gas collection 20. Chemicals (CH), such as corrosion inhibitor and methanol, may also be introduced into produced gas collection 20. As noted hereinabove, the condensed liquids may be introduced into de-oiling 30 via condensed liquids line 21. The remaining gas may be extracted as fuel gas (FG) from produced gas collection 20. The fuel gas may be utilized for glycol heating and cooling in glycol heating and cooling step, apparatus, or block 100 and/or for steam generation in steam generation 50, as indicated in the embodiment of FIG. 1.

A SAGD processing facility can further comprise slops and de-sanding step, apparatus, or block 90 configured to subject slop liquids to collection and processing for oil/water separation or removal from the SAGD processing facility (e.g., to segregate sand and recalcitrant emulsion for offsite disposal), a glycol heating and cooling step, apparatus, or block 100 configured to facilitate heat recovery and rejection throughout the facility and utilize fuel gas (e.g., natural gas and/or gas from produced gas collection 20) as a heat input to the process (e.g., to heat glycol for use as a process heating medium), and/or utilities step, apparatus, or block 110 configured to provide instrument air and natural gas distribution for the SAGD facility.

Typical SAGD developments may be built implementing the technologies described above, for example using conventional design and execution strategies for fabrication and construction of the facilities. These approaches may not sufficiently leverage best-in-class technologies, nor do they sufficiently implement leading technologies for fabrication and construction, such as advanced modularization. As such, future SAGD developments utilizing conventional designs may not meet desired economic targets, e.g. net present value or rate of return.

Embodiments disclosed herein may comprise a process comprising a modified design and execution of SAGD CPF facilities through optimal implementation of best-in-class technologies, building on available synergies to arrive at a functional design with minimum scope, and optimal packaging of the required scope (e.g., through application of advance modularization approaches, in some embodiments), resulting in a best-in-class capital cost design. Such design may provide an economically viable solution for the CPF component of SAGD projects over the project life (e.g., in a long term low oil price environment). An embodiment of a process may comprise selection and integration of best-in-class technologies into an optimal process configuration. Additionally, an embodiment may comprise packaging of the optimized project scope (mechanical, electrical and instrumentation equipment and bulk materials) in an advanced modular design.

Figure 2:
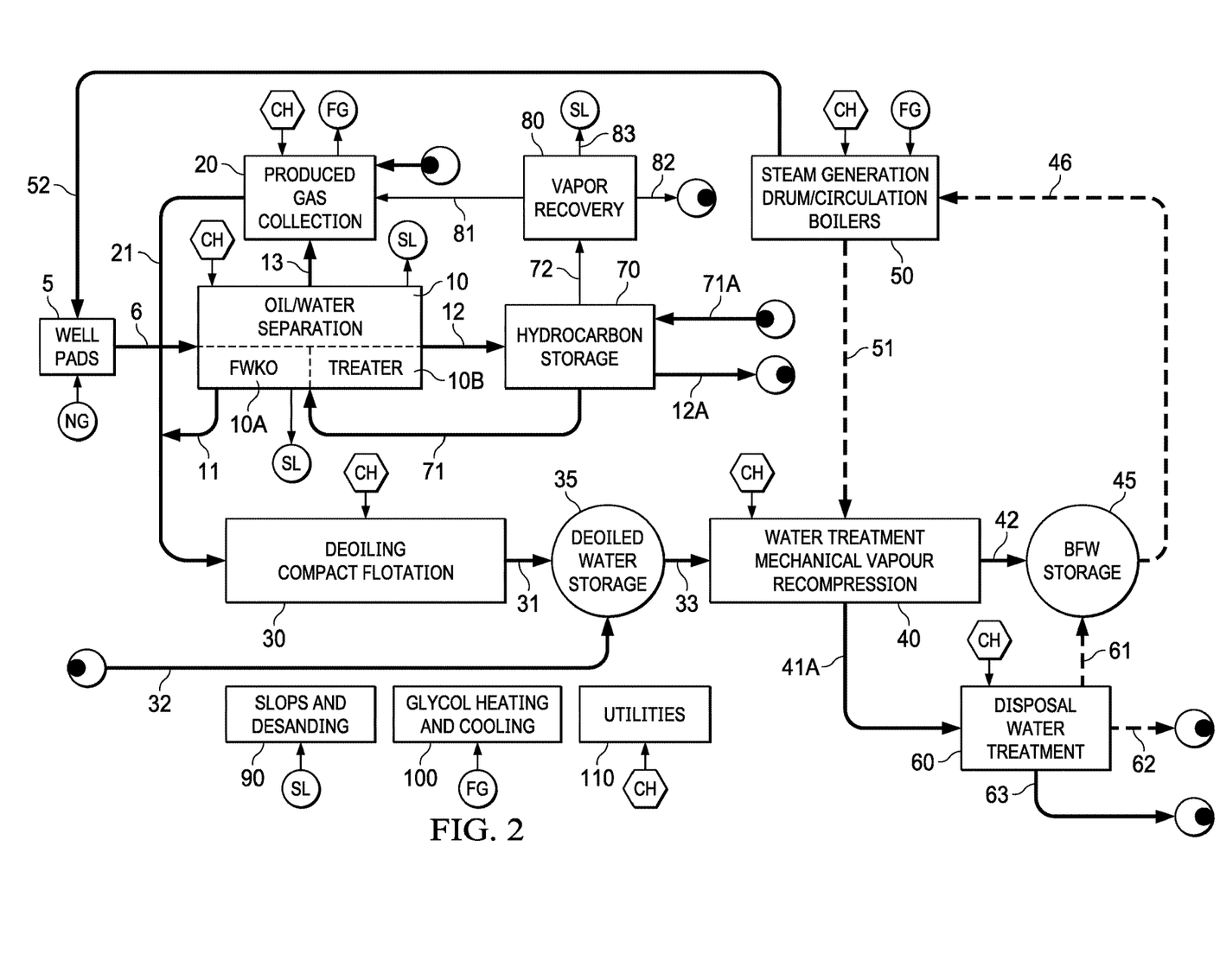
FIG. 2 is a schematic of a SAGD processing facility II, according to an embodiment of this disclosure.

The process flow configuration for a proposed embodiment is shown in FIG. 2, which is a schematic of a SAGD processing facility II, according to an embodiment of this disclosure. In the embodiment shown in FIG. 2, an optimal process configuration may be achieved via implementation of one or more improved technologies. Unless otherwise noted, the process steps, apparatus, or blocks of FIG. 2 may be as described with regard to the embodiment of FIG. 1, and will not be reiterated here.

In some embodiments, oil/water separation 10 comprises primary oil/water separation via a FWKO and secondary oil/water separation via an optional diluent based degassing via diluent based oil treating (e.g., addition of hydrocarbon from hydrocarbon storage 70 via diluent line 71). In some embodiments, oil/water separation 10 comprises optional degassing via a pressure reduction vessel and emulsion degassing vessel. The optional degassing may change the operating conditions (e.g., the pressure profile) relative to typical SAGD CPFs. For example, a conventional SAGD CPF will limit the pressure drop of the emulsion from the battery limit to avoid installing pumps between oil/water separation 10 and hydrocarbon storage 70. Light hydrocarbon may be added to effect the oil/water separation step 10, for example, via diluent line 71 from hydrocarbon storage 70. In some embodiments, the produced water in produced water line 11 from oil/water separation 10 has a temperature in a range of from about 125° C. to about 140° C. In some embodiments, the produced water in produced water line 11 from oil/water separation 10 has a pressure in a range of from about 800 kPa to about 1200 kPa.

In some embodiments, compact flotation (e.g., via at least one compact flotation unit (CFU)) is utilized for the de-oiling at 30. CFU technology combines centrifugal separation and gas flotation into a single pressure vessel, which can be operated at elevated pressures and temperatures. Accordingly, in some embodiments, the produced water separated from the produced fluid at oil/water separation 10 is not subjected to temperature and/or pressure reduction prior to introduction into de-oiling 30. In some embodiments, the produced water in produced water line 11 is not stored prior to introduction into de-oiling 30. Compact flotation technology, rather than conventional technology, such as gas flotation, enables de-oiling 30 to be pressurized, and eliminates the need for cooling and then reheating the water, by allowing the water to remain hot throughout the de-oiling 30 and water treatment 40.

In some embodiments, the de-oiled water in de-oiled water line 31 from de-oiling 30 has a temperature in a range of from about 115° C. to about 140° C. In some embodiments, the de-oiled water in de-oiled water line 31 from de-oiling 30 has a pressure in a range of from about 800 kPag to about 1200 kPag.

In some embodiments, the de-oiled water is stored in a de-oiled water storage apparatus 35. In some embodiments, the de-oiled water storage apparatus comprises a pressure vessel (e.g., is not an atmospheric storage vessel), and thus requires no additional containment.

In some embodiments, water treatment step, apparatus, or block 40 utilizes mechanical vapor recompression (MVR) evaporation technology, rather than conventional water treatment (e.g., comprising lime softening 40A and ion exchange 40B, as described with reference to the embodiment of FIG. 1). MVR evaporation comprises a simple distillation process that can be employed to produce a distillate water stream suitable for use in conventional steam generation systems (e.g., non-OTSGs). MVR is an energy recovery process wherein compression is utilized to add energy to lower pressure water vapor to produce a marginally smaller volume of vapor at a higher temperature and pressure; the compressed vapor is then utilized to heat the de-oiled water to produce additional low pressure vapor. In some embodiments, the treated water in treated water line 42 (and/or the stored, treated water in stored treater water line 46) has a temperature in a range of from about 115° C. to about 130° C. In some embodiments, the treated water in treated water line 42 from water treating 40 (and/or stored treater water in stored, treated water line 46 from BFW storage 45) has a pressure in a range of from about 400 kPag to about 800 kPag. In some embodiments, the treated water in treated water line 42 (and/or the stored, treated water in stored, treater water line 46) can comprise minor amounts of contaminants, such as hydrocarbons, salts, and the like.

When utilizing MVR at water treatment 40, lime sludge can be substantially or completely avoided, and in some embodiments, may not be needed. In such embodiments, a line 41A may be utilized to remove contaminants from the MVR evaporation of water treatment 40. When MVR and conventional steam generators are used, the concentrate stream 41A from the MVR unit may be sent to the disposal water treatment system 60, again producing a solids stream 63 and/or a concentrated brine stream 62 which may be sent offsite for disposal.

In some embodiments, the treated water in treated water line 42 is stored in a BFW storage apparatus 45. In some embodiments, the BFW storage apparatus 45 comprises a pressure vessel (e.g., is not an atmospheric storage vessel), and thus requires no additional containment.

In some embodiments, the treated water (e.g., the BFW) in line 42/46 is a high quality water that is sufficiently uncontaminated that conventional steam generators (e.g., drum boilers and/or circulation boilers, rather than OTSGs) can be utilized, optionally with some modifications, at steam generation 50. In some embodiments, BFW from the MVR process is of such higher quality that conventional steam generators, optionally with some modifications, can be used to produce steam quality in the range of at least 94, 95, 96, or 97% or higher. Such conventional steam generators may be more easily modularized than OTSGs, and enable a further reduction in the footprint of a SAGD processing facility of this disclosure. Such modularized steam generators can require less on-site field fabrication than OTSGs.

The use of MVR technology in water treatment 40 may also (via providing water of a quality sufficient for the use of conventional steam generators in steam generation 50) enable elimination of the hot water recycle in steam generator blowdown line 53, and thus such a line 53 may not be employed in a SAGD processing facility, such as SAGD processing facility II, according to embodiments of this disclosure. Similarly, steam generation blowdown in steam generation blowdown line 51 may be reduced (e.g., to 2% to 5%) as opposed to a steam generation blowdown in a steam generation blowdown line 51 produced via a steam generation 50 comprising OTSG(s). Elimination or reduction of blowdown from the steam generation 50 can, in some embodiments, reduce the footprint and scope traditionally needed for separating such blowdown water from steam and recovering additional portions of that blowdown water (e.g., via flash or a dedicated evaporative system). Steam generation may utilize cogeneration technology, whereby electricity and steam are produced.

As noted hereinabove, a SAGD CPF of this disclosure can further comprise a disposal water treatment 60. A disposal water treatment step, apparatus, or block 60 may, in some embodiments, utilize modified technology, possibly as a result of implementing the MVR process for water treatment 40. In some embodiments, disposal water treatment 60 effects primarily or solely solids separation. Such solids separation may comprise, for example, filtration. In some embodiments, the use of MVR evaporation at water treatment 40 may result in a concentrated brine for disposal in concentrated brine disposal line 62. In some embodiments, the use of MVR evaporation at water treatment 40 may result in a recovered water in recovered water line 61.

In some embodiments, optimized packaging of the scope may be achieved via the use of Fluor's patented $3^{rd}$ Gen Modular execution$^{SM}$ design methodology, which is described in U.S. Pat. No. 8,931,217 and U.S. patent application Ser. No. 15/440,812, the disclosure of each of which is hereby incorporated herein by reference except to the extent it might directly conflict with the present disclosure.

Key concepts of the 3rd Gen design process will now be described briefly. The overall process may be broken down into individual process blocks, such as noted hereinabove with reference to a SAGD facility of this disclosure. The detailed design of each process block may be then physically arranged within one or more modules to optimize the synergy between the equipment and the associated piping, electrical, and control systems. These modules may be then laid out synergistically, based on the overall process flow between the process blocks, to minimize the number and lengths of the required module interconnects. In some embodiments, process blocks and/or modules forming process blocks are not connected via external piping (e.g., via pipe racks), but are interconnected directly (e.g., with such connection typically located within the envelopes of the relevant process blocks). Techniques may be used to maximize the amount of equipment, including rotating equipment, which may be installed in modules. Modules may be designed based on weight and weight distribution (e.g., center of gravity) limits, module flexing/distortion, vibration limits (on operation and/or transport), size limits, maintainability (in view of space limitations driven by high density modularization), interconnections of modules and connection of modules to (e.g., underground) fiber optic backbone and/or main electrical supply at the site, integration of E&I systems into individual modules with E&I systems unfriendly environments, location and heat management of major power equipment within modules, and the like, such that the modules can be safely transported (e.g., via rail and/or truck) and positioned on-site. By way of example, heat exchanger selection (e.g., shell and tube, plate and frame, or plate and shell) may be made and the size/arrangement thereof selected to suit the modularization approach.

The modules may be broken down into two primary types: equipment modules and pipeway modules. Equipment modules may contain primarily equipment, but also some piping, which connects equipment within the same module, and electrical cable. Pipeway modules can contain primarily piping, which interconnects equipment and systems between modules or process blocks. In some embodiments, the pipeway modules may be situated directly above the equipment modules, thus minimizing the interconnecting piping lengths. In some embodiments, drain systems may be integrated into the module(s), below the floor level, to eliminate the need for underground piping. In some embodiments, a distributed electrical and instrumentation (E&I) system may be implemented, where the design is configured so that electrical rooms and control systems cabinets can be installed on modules, maximizing the amount of electrical equipment and instrumentation to be installed, wired, and tested on the modules, rather than on-site. In some embodiments, each process block (e.g., oil/water separation process block 10, produced gas collection process block 20, de-oiling process block 30, water treatment process block 40, steam generation process block 50, disposal water treatment block 60, hydrocarbon storage process block 70, vapor recovery process block 80, slops and de-sanding process block 90, glycol heating and cooling process block 100, and/or utilities process block 110) comprises at least one distributed E&I room on at least one module of the process block, and each such distributed E&I room is in communication (e.g., via fiber optic cable which may or may not be underground) with a central control room. For example, a SAGD processing facility of this disclosure may comprise 5, 6, 7, 8, 9, or 10 distributed E&I rooms connected to a central control room. Such distributed E&I can, in some embodiments, reduce the on-site field work required to prepare the modularized SAGD processing facility of this disclosure for operation. Similarly, in some embodiments, electrical distribution from the main electrical supply to the individual electrical rooms may be done underground (e.g., with each process block typically having its own electrical room for electrical and instruments (E & I) for that process block).

Figure 3:
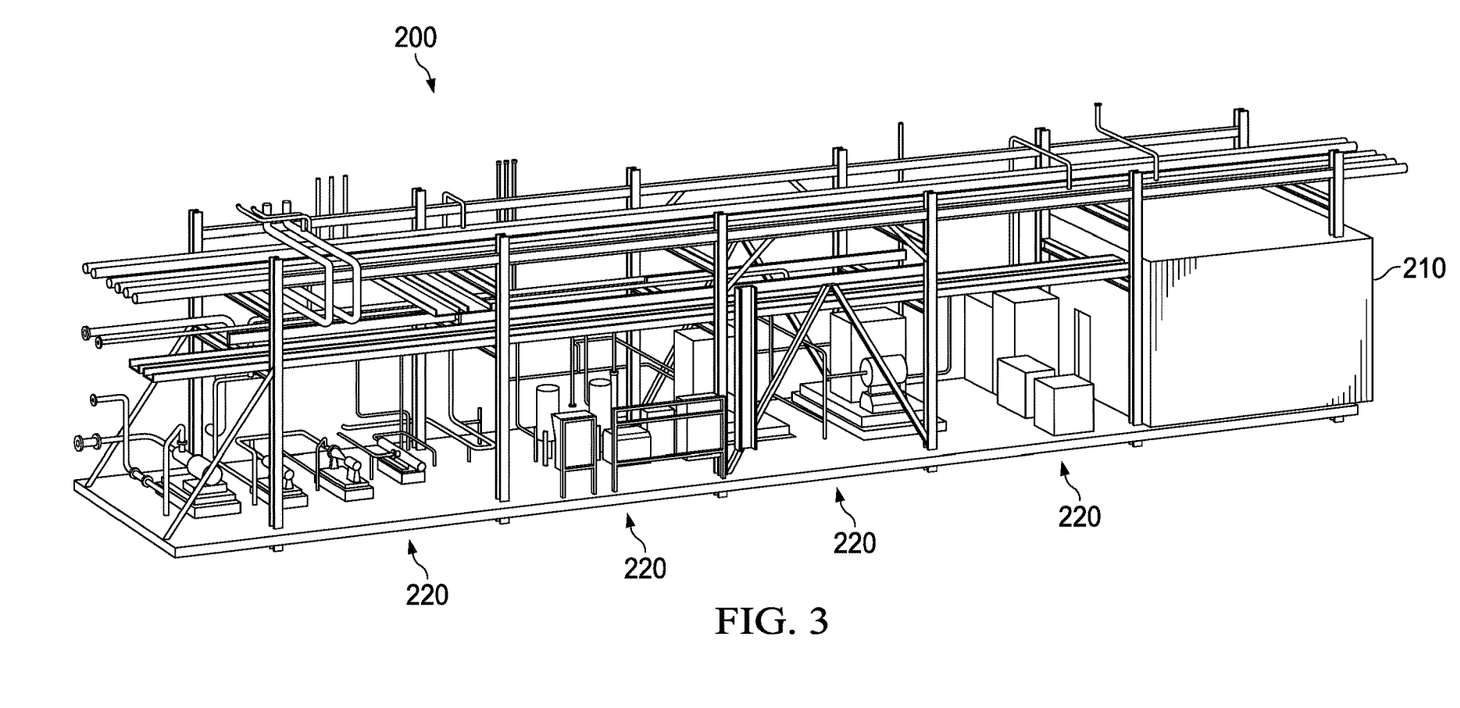
FIG. 3 shows an exemplary equipment module 200, according to an embodiment of this disclosure.
Figure 4:
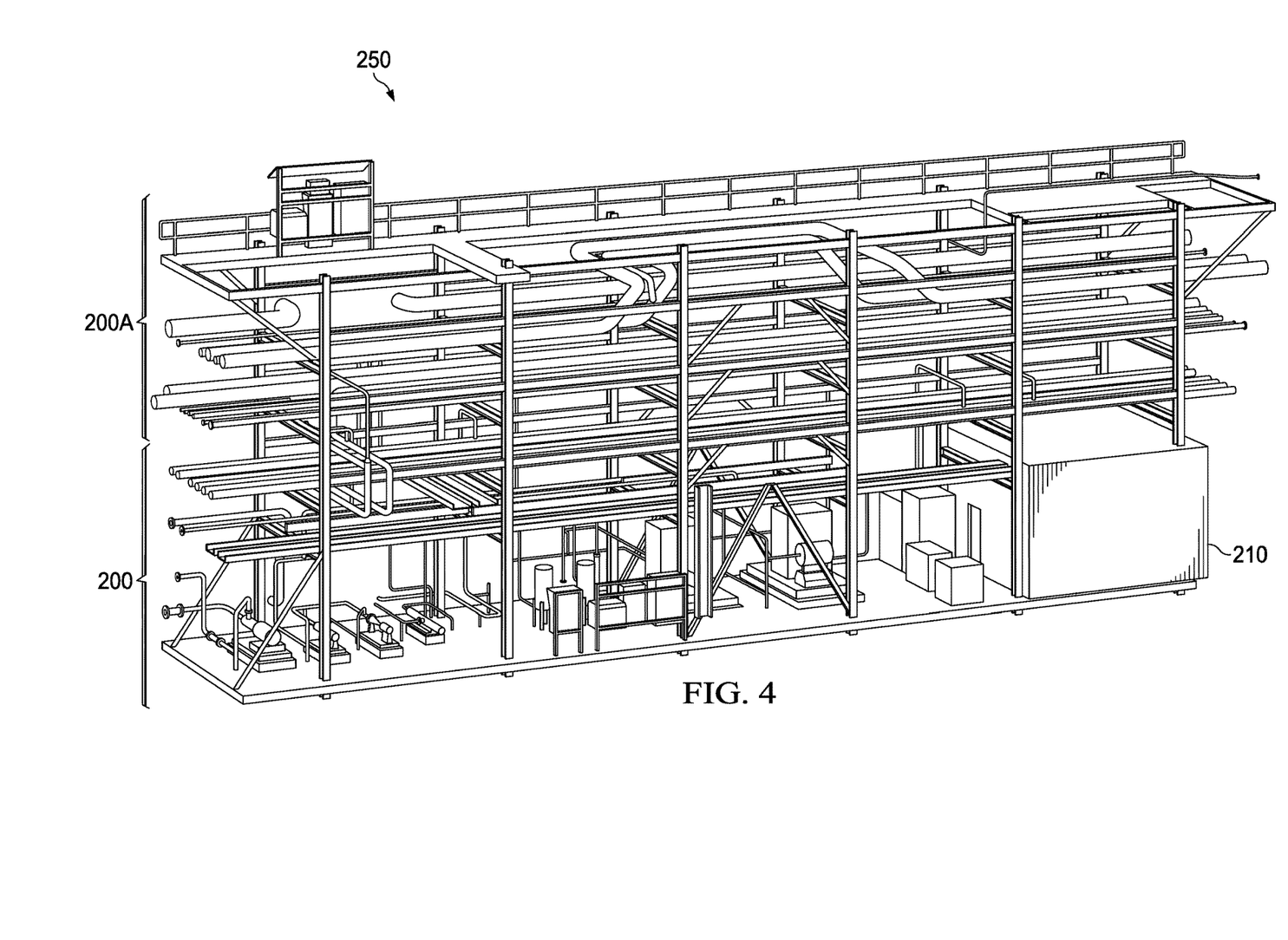
FIG. 4 shows the exemplary equipment module 200 of FIG. 4 interconnected with a piping module 200A directly thereabove, according to an embodiment of this disclosure.

The modules are designed to easily interconnect in a predetermined way once transported to the on-site location for the SAGD processing facility. The modules may be designed as 'plug-and-play' modules, wherein modules are self-contained, high-density, pre-tested modules requiring primarily or substantially solely interconnections at the site. By way of example, FIG. 3 shows an exemplary equipment module 200, according to an embodiment of this disclosure. Equipment module 200 comprises E&I room 210 and a variety of equipment 220. E&I room 210 is in communication with equipment 220, and also with a main electrical supply (not shown in FIG. 3) and a central control room (also not shown in FIG. 3). FIG. 4 shows the exemplary equipment module 200 of FIG. 4 interconnected with a piping module 200A directly thereabove, to provide integrated/interconnected binary module 250 according to an embodiment of this disclosure.

In some embodiments, the various processes of FIG. 2 may be carried out by a plurality of process blocks (e.g., with at least one process block for each such process of FIG. 2), which may be designed, configured, and/or connected as discussed herein (e.g., using modularization technologies and/or a 'zero base' engineering approach wherein traditionally used design margins are eliminated, resulting in minimized redundancy and equipment overcapacity). To assist in module connection, each such process block may comprise one or more (e.g., a plurality of) modules. Thus, as per this disclosure, modularization technologies may be applied to a SAGD processing facility. In some embodiments, a modularized SAGD processing facility according to this disclosure can process produced fluid at a rate of at least 30, 35, or 40 KBPD (i.e., 30, 35, or 40 thousand barrels per day of bitumen) or in a range of from 30 to 110, from 40 to 110, or from 50 to 100 KBPD, and comprises less than about 50, 60, or 70 total (e.g., equipment plus piping) modules, or from about 30 to 100, from 40 to 90, or from 40 to 60 total modules. In some embodiments, a modularized SAGD processing facility according to this disclosure can process produced fluid at a rate of at least 20, 35, or 30 KBPD, or from 20 to 25, 10 to 25, or 10 to 20 KBPD, and comprises less than about 40, 50 or 60 equipment modules, or from about 40 to 60, from 40 to 70, or from 50 to 60 modules.

Accordingly, in some embodiments, the number of modules and overall system cost of a SAGD processing facility may be reduced by pursuing advancements in modularization technology leading to higher plug-and-play functionality, and higher module equipment density as described herein. Without limitation, such advancements may include one or more of: (1) integration of pipeways with mechanical/E&I (electrical and instrumentation) modules; (2) employing distributed E&I (e.g., moving E&I completion to module assembly yard); (3) imbedding/integrating traditionally underground process piping into module frames; (4) letting modularization constraints drive equipment implementation; (5) having the layout driven by modularization, rather than vice versa; (6) installing and testing a majority of the piping and E&I at the module assembly yard; (7) locating E&I equipment within modules and/or closer to the user; (8) employing underground fiber optic and/or power (e.g., electrical) distribution; and (9) installing a majority of the instrumentation and control within modules.

Some of the benefits of the process depicted in FIG. 2 and described herein will now be described. Via the herein disclosed SAGD processing facility and method, thermal energy in the production fluid from the field may be retained within the process to the maximum extent possible. This may maximize overall energy efficiency and may minimize the amount of heat transfer equipment within the system. Pressure energy in the production fluid from the field may be retained within the process to the maximum extent possible. This may minimize the energy required to produce injection steam at the required battery limit conditions. For example, utilization of compact flotation (and a CFU) for de-oiling 30 eliminates the need for pressure and/or temperature reduction of the produced water upstream of and/or within de-oiling 30 and/or water treatment 40, in some embodiments.

Process water recycled within the CPF may be minimized, minimizing and/or eliminating the need for equipment and systems to recycle water within the CPF process. For example, the utilization of MVR evaporation at water treatment 40 and conventional (e.g., non-OTSG) steam generators at steam generation 50 may reduce or eliminate the blowdown recycled via steam generation blowdown line 53 and or steam generation blowdown line 51. In some embodiments, overall, total water consumption may be minimized.

There may be a reduction in the amount of solid waste from the process being sent to the landfill. The process configuration may reduce the total amount of equipment, resulting in a reduction in bulk material quantities associated with that equipment, primarily in piping and electrical materials. The reduced scope and implemented technologies of the SAGD processing facility of this disclosure may enhance the ability to modularize equipment and systems off-site.

Additionally, the required scope to integrate the process systems (specifically piping and electrical materials) can be significantly reduced beyond what would be possible if the proposed process configuration were packaged using conventional modularization techniques. More of the construction can be done in a controlled environment in a modular fabrication facility (e.g., away from the final construction site for the facility as a whole), where work may be done more safely, productively, predictably, and to a higher level of quality, as compared to installation at the construction site, resulting in a lower total project cost. Pre-assembling the modules off-site to the extent possible can reduce on-site construction costs and thus decrease the overall construction cost (e.g., the total installation cost, TIC) of the facility. In some embodiments, the TIC is reduced at least 10, 20, or 30% relative to a conventional SAGD processing facility or a conventionally modularized SAGD processing facility.

As noted above, the piping and electrical interfaces between modules may be minimized, in some embodiments, so there may be less field work required to execute connections in the field (e.g., at the SAGD processing facility). The process may provide the ability to perform parallel construction at the site and at the module yard, potentially providing opportunities to reduce the overall schedule. For example, the utilization of distributed E&I and/or an E&I room positioned on a module associated with each main process step may enable a reduction in the number of connections between modules and/or process blocks, and/or for fewer connections between modules and a main electrical supply and/or fiber optic line. Design of the modularized SAGD processing facility as described herein may allow electrical and/or fiber optic lines to be run underground on-site (e.g., at the SAGD processing facility) in advance of the modules being positioned at the site (e.g., concomitantly with module fabrication off-site).

The improved configuration may reduce the overall plot area requirements, resulting in less land disturbance. In some embodiments, the herein-disclosed SAGD processing facility utilizes a highly modularized approach to achieve a reduction in footprint, and/or investment of at least 15, 20, 25, or 30% without negatively impacting reliability, maintainability, and operating costs. In some embodiments, the herein-disclosed SAGD processing facility utilizes a highly modularized approach to achieve a reduction in the number of modules (e.g., total number of modules and/or equipment modules), by at least 30, 35, or 40%. In some embodiments, the herein-disclosed SAGD processing facility utilizes a highly modularized approach to achieve a reduction in on-site installation man-hours and/or a combined labor and equipment/material cost of at least 35, 40, 45, or 50%. Energy use by the SAGD processing facility may be reduced via the herein-disclosed SAGD processing facility. The herein-disclosed SAGD processing facility can be standardized, is easily replicable, is scalable, and may include cogeneration, as described hereinabove. The SAGD processing facility of this disclosure may be designed to provide a sufficiently wide processing window to accommodate at least 70, 75, or 80% of the processing conditions expected for a specific on-site location (e.g., Alberta oil sands).

In some embodiments, a SAGD processing facility of this disclosure is utilized with enhanced-solvent SAGD (ES-SAGD), in which a hydrocarbon liquid is co-injected as a solvent with the steam. ES-SAGD may be utilized to reduce the volumetric steam to oil ratio (SOR). The solvent (minus some losses) is produced back to the well pads with the oil (e.g., bitumen). Persons of skill will appreciate these and other possible benefits and advantages to the present disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Figure 5:
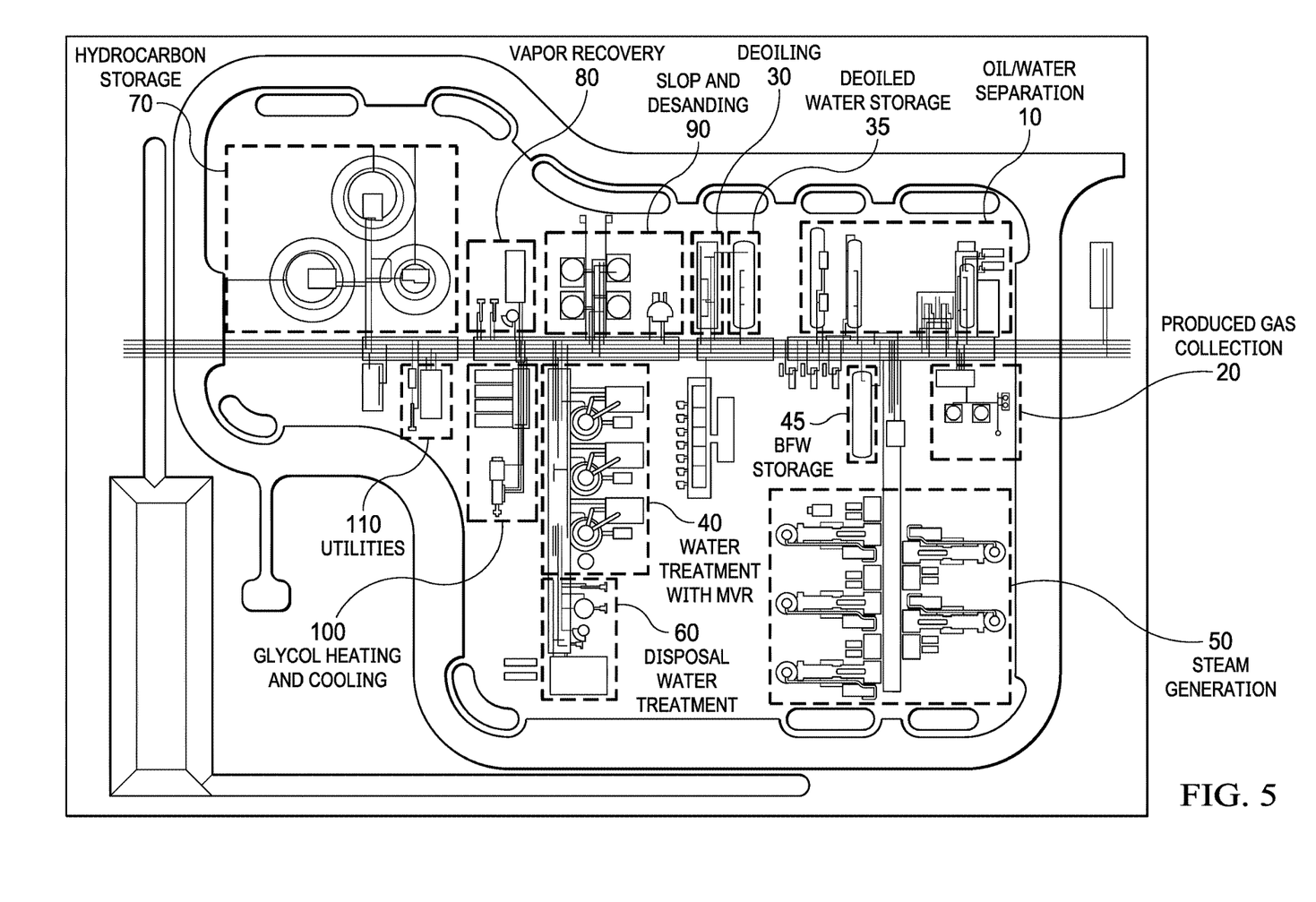
FIG. 5 is an exemplary plot plan of a SAGD processing facility III, according to an embodiment of this disclosure.

Example 1: Plot Plan of an Exemplary SAGD Processing Facility According to this Disclosure FIG. 5 is an exemplary plot plan of a SAGD processing facility III, according to an embodiment of this disclosure. Although other layouts are envisioned and within the scope of this disclosure, FIG. 5 illustrates how technology selection and modularization of the process blocks of a SAGD processing facility according to this disclosure provides a reduced scope relative to conventional SAGD processing facilities. SAGD processing facility III of the embodiment of FIG. 5 comprises oil/water separation process block 10, produced gas collection process block 20, de-oiling process block 30, de-oiled water storage process block 35, water treatment process block 40, BFW storage process block 45, steam generation process block 50, disposal water treatment process block 60, hydrocarbon storage process block 70, vapor recovery process block 80, slop and de-sanding process block 90, glycol heating and cooling process block 100, and utilities process block 110.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$ is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

Additional Description

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the terms "optionally," "may," "might," "possibly," and the like with respect to any element of a claim means that the element is required, or alternatively, the element is not required, both alternatives being within the scope of the embodiments. Also, references to examples are merely provided for illustrative purposes, and are not intended to be exclusive.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Embodiments disclosed herein include:

A: A steam assisted gravity drainage (SAGD) processing facility comprising: an oil/water separation process block operable for bulk separation of produced water from a produced fluid comprising produced water and hydrocarbons, wherein the oil/water separation process block comprises an inlet for the produced fluid and an outlet for the produced water separated from the produced fluid; a de-oiling process block operable to remove residual oil from the produced water separated from the produced fluid in the oil/water separation process block and provide a de-oiled water, wherein the de-oiling process block comprises an inlet for the produced water from the oil/water separation block and an outlet for the de-oiled water; a water treatment block operable to remove contaminants from the de-oiled water and provide a treated water, wherein the water treatment process block comprises an inlet for the de-oiled water and an outlet for the treated water; and a steam generation process block operable to produce steam from the treated water, wherein the steam generation process block comprises an inlet for the treated water and an outlet for steam, wherein: each of the oil/water separation process block, the de-oiling process block, the water treatment process block, and the steam generation process block is modularized and comprises a plurality of modules; the de-oiling process block comprises a compact flotation unit, the water treatment process block comprises a mechanical vapor recompression evaporation apparatus, the steam generation process block does not comprise a once through steam generator (OTSG), or a combination thereof; the SAGD processing facility comprises no pressure reduction apparatus, no temperature reduction apparatus, or both no pressure reduction apparatus and no temperature reduction apparatus to reduce the pressure or the temperature, respectively, of the produced water separated from the produced fluid in the oil/water separation process block prior to introduction of the separated produced water into the de-oiling process block; or a combination thereof.

B: A method for operating a steam assisted gravity drainage processing facility, the method comprising: effecting bulk separation of produced water from a produced fluid comprising the produced water and hydrocarbons; removing residual oil from the produced water to provide a de-oiled water; removing contaminants from the de-oiled water to provide a treated water; and generating steam from the treated water, wherein: each of the effecting bulk separation, the removing residual oil, the removing contaminants, and the generating steam is performed via a plurality of modules; the removing residual oil from the produced water is effected via compact flotation, the removing contaminants from the de-oiled water is effected via mechanical vapor recompression evaporation, the generating steam from the treated water is not effected via a once through steam generator (OTSG), or a combination thereof; the temperature, the pressure, or both the temperature and the pressure of the produced water separated from the produced fluid via the bulk separation is not reduced prior to removing residual oil from the produced water; or a combination thereof.

C: A method for assembling a steam assisted gravity drainage (SAGD) processing facility, the method comprising: providing a plurality of modules for each of a number of process blocks including: an oil/water separation process block (a) operable for bulk separation of produced water from a produced fluid comprising the produced water and hydrocarbons, wherein the oil/water separation process block comprises an inlet for the produced fluid and an outlet for the produced water separated from the produced fluid; a de-oiling process block (b) operable to remove residual oil from the produced water separated from the produced fluid in the oil/water separation process block and provide a de-oiled water, wherein the de-oiling process block comprises an inlet for the produced water from the oil/water separation block and an outlet for de-oiled water; a water treatment block (c) operable to remove contaminants from the de-oiled water and provide a treated water, wherein the water treatment process block comprises an inlet for the de-oiled water and an outlet for the treated water; and a steam generation process block (d) operable to produce steam from the treated water, wherein the steam generation process block comprises an inlet for the treated water and an outlet for steam, wherein each process block (a), (b), (c), and (d) includes an electrical and instrumentation (E&I) room on at least one of the plurality of modules for that process block; interconnecting the plurality of modules within process blocks (a), (b), (c), and (d); connecting process blocks (a) and (b), (b) and (c), and (c) and (d); and connecting each E&I room with a central control room and a main electrical supply.

D: A steam assisted gravity drainage (SAGD) processing facility comprising: an oil/water separation process block operable for bulk separation of produced water from a produced fluid comprising the produced water and hydrocarbons, wherein the oil/water separation process block comprises an inlet for the produced fluid and an outlet for the produced water separated from the produced fluid; a de-oiling process block operable to remove residual oil from the produced water removed from the oil/water separation process block and provide a de-oiled water, wherein the de-oiling process block comprises a compact flotation unit comprising an inlet for the produced water from the oil/water separation block and an outlet for the de-oiled water; a water treatment block operable to remove contaminants from the de-oiled water and provide a treated water, wherein the water treatment process block comprises mechanical vapor recompression evaporation apparatus comprising an inlet for the de-oiled water and an outlet for the treated water; and a steam generation process block operable to produce steam from the treated water, wherein the steam generation process block comprises a boiler comprising an inlet for the treated water and an outlet for steam, wherein each of the oil/water separation process block, the de-oiling process block, the water treatment process block, and the steam generation process block is modularized and comprises a plurality of modules.

Each of embodiments A, B, C, and D may have one or more of the following additional elements: Element 1: further comprising a disposal water treatment process block operable to prepare a disposal water from the water treatment process block for disposal. Element 2: wherein the disposal water treatment process block consists primarily or solely of solids separation apparatus. Element 3: wherein a boiler of the steam generation process block provides at least 97% steam efficiency. Element 4: wherein the boiler comprises a drum boiler or a circulation boiler. Element 5: wherein each of the oil/water separation process block, the de-oiling process block, the water treatment process block, and the steam generation process block is modularized and comprises the plurality of modules, and further comprising a distributed electrical and instrumentation system, wherein each of the oil/water separation process block, the de-oiling process block, the water treatment process block, and the steam generation process block comprises an electrical and instruments (E&I) room. Element 6: wherein the E&I room is located on at least one module of the plurality of modules. Element 7: further comprising a central control room, wherein each of the at least one modules of the plurality of modules on which the E&I rooms are located is in communication with the central control room. Element 8: further comprising underground electrical distribution from a main electrical supply to each of the at least one modules of the plurality of modules on which the E&I rooms are located. Element 9: wherein each of the oil/water separation process block, the de-oiling process block, the water treatment process block, and the steam generation process block is modularized and comprises the plurality of modules, and wherein the plurality of modules comprise equipment modules and pipeway modules. Element 10: wherein a majority of the pipeway modules are located above the equipment modules. Element 11: wherein a majority of the equipment modules comprise a drain system below a floor level. Element 12: further comprising: a de-oiled water storage apparatus comprising an inlet fluidly connected with the de-oiling process block, whereby de-oiled water from the de-oiling process block can be introduced into the de-oiled water storage apparatus, and an outlet fluidly connected with the water treatment process block, whereby stored de-oiled water can be introduced into the water treatment process block; a boiler feed water (BFW) storage apparatus comprising an inlet fluidly connected with the de-oiling process block, whereby treated water from the water treatment process block can be introduced into the BFW storage apparatus, and an outlet fluidly connected with the steam generation process block, whereby stored, treated water can be introduced into the steam generation process block as BFW. Element 13: wherein the de-oiled water storage apparatus, the BFW storage apparatus, or both are pressurized. Element 14: wherein the SAGD processing facility comprises less than about 60 modules. Element 15: wherein each of the effecting bulk separation, the removing residual oil, the removing contaminants, and the generating steam is performed via a plurality of modules, and wherein each plurality of modules comprises an electrical and instruments (E&I) room on at least one module thereof. Element 16: further comprising a central control room, wherein each of the at least one modules on which the E&I rooms are located is in communication with the central control room. Element 17: further comprising distributing electricity, primarily below ground, from a main electrical supply to each of the at least one modules on which the E&I rooms are located. Element 18: wherein: the de-oiling process block (b) comprises a compact flotation unit, the water treatment process block (c) comprises a mechanical vapor recompression evaporation apparatus, the steam generation process block (d) does not comprise a once through steam generator (OTSG), or a combination thereof; the SAGD processing facility comprises no pressure reduction apparatus, no temperature reduction apparatus, or both no pressure reduction apparatus and no temperature reduction apparatus to reduce the pressure or the temperature, respectively, of the produced water separated from the produced fluid in the oil/water separation process block (a) prior to introduction of the separated produced water into the de-oiling process block (b); or a combination thereof. Element 19: wherein connecting each E&I room with the main electrical supply comprises underground connecting.

While several embodiments have been provided in the present disclosure, it should be understood that the disclosed systems and methods may be embodied in many other specific forms without departing from the spirit or scope of the present disclosure. The embodiments and present examples are to be considered as illustrative and not restrictive, and the intention is not to be limited to the details given herein. Many variations and modifications of the invention disclosed herein are possible and are within the scope of the invention. For example, the various elements or components may be combined or integrated in another system or certain features may be omitted or not implemented. Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A steam assisted gravity drainage (SAGD) processing facility comprising:
   an oil/water separation process block configured for bulk separation of produced water from a produced fluid comprising produced water and hydrocarbons, wherein the oil/water separation process block comprises a separation process inlet for the produced fluid and a separation process outlet for the produced water separated from the produced fluid;
   a de-oiling process block configured to remove residual oil from the produced water separated from the produced fluid in the oil/water separation process block by compact flotation and to provide a de-oiled water, wherein the de-oiling process block comprises a de-oiling process inlet for the produced water from the oil/water separation process block and a de-oiling process outlet for the de-oiled water, wherein the produced water is not subjected to temperature and pressure reduction prior to introduction into and within the de-oiling process block;
   a water treatment process block configured to remove contaminants from the de-oiled water and provide a treated water, wherein the water treatment process block comprises a water treatment process inlet for the de-oiled water and a water treatment process outlet for the treated water; and
   a steam generation process block configured to produce steam from the treated water, wherein the steam generation process block comprises a steam generation process inlet for the treated water and a steam generation process outlet for steam,
   wherein each of the oil/water separation process block, the de-oiling process block, the water treatment process block, and the steam generation process block is modularized and comprises a plurality of modules.

2. The SAGD processing facility of claim 1, further comprising a disposal water treatment process block configured to prepare a disposal water from the water treatment process block for disposal.

3. The SAGD processing facility of claim 2, wherein the disposal water treatment process block consists primarily or solely of solids separation apparatus.

4. The SAGD processing facility of claim 1, wherein a boiler of the steam generation process block is configured to provide at least 97% steam efficiency.

5. The SAGD processing facility of claim 4, wherein the boiler comprises a drum boiler or a circulation boiler.

6. The SAGD processing facility of claim 1, further comprising: a distributed electrical and instrumentation system, wherein each of the oil/water separation process block, the de-oiling process block, the water treatment process block, and the steam generation process block comprises an electrical and instruments (E&I) room.

7. The SAGD processing facility of claim 6, wherein the electrical and instruments (E&I) room of each of the oil/water separation process block, the de-oiling process block, the water treatment process block, and the steam generation process block is located on at least one module of the plurality of modules of each of the oil/water separation process block, the de-oiling process block, the water treatment process block, and the steam generation process block.

8. The SAGD processing facility of claim 7, further comprising: a central control room, wherein the at least one module of the plurality of modules of each of the oil/water separation process block, the de-oiling process block, the water treatment process block, and the steam generation process block is in communication with the central control room.

9. The SAGD processing facility of claim 7, further comprising: underground electrical distribution from a main electrical supply to the at least one module of the plurality of modules of each of the oil/water separation process block, the de-oiling process block, the water treatment process block, and the steam generation process block.

10. The SAGD processing facility of claim 1 further comprising:
    a de-oiled water storage apparatus comprising a de-oiled water storage inlet fluidly connected with the de-oiling process block, wherein the de-oiling process block is configured to introduce de-oiled water from the de-oiling process block into the de-oiled water storage apparatus, and a de-oiled water storage outlet fluidly connected with the water treatment process block, wherein the de-oiled water storage outlet is configured to introduce stored de-oiled water into the water treatment process block.

11. The SAGD processing facility of claim 10, wherein the de-oiled water storage apparatus is pressurized.

12. The SAGD processing facility of claim 1, wherein the produced fluid is provided at a rate of up to 120,000 barrels per day (BPD), and wherein the SAGD processing facility comprises less than about 60 modules.

13. The SAGD processing facility of claim 1, further comprising:
    a boiler feed water (BFW) storage apparatus comprising a BFW storage inlet fluidly connected with the de-oiling process block, wherein the BFW storage inlet is configured to introduce treated water from the water treatment process block into the BFW storage apparatus, and a BFW storage outlet fluidly connected with the steam generation process block, wherein the BFW storage outlet is configured to introduce stored, treated water into the steam generation process block as BFW.

14. The SAGD processing facility of claim 13, wherein the BFW storage apparatus is pressurized.

15. The SAGD processing facility of claim 1, wherein the de-oiling process block comprises a compact flotation unit.

16. The SAGD processing facility of claim 15, wherein the de-oiling process block is configured to remove residual oil from the produced water in the compact flotation unit.

17. The SAGD processing facility of claim 1, wherein the water treatment process block comprises a mechanical vapor recompression evaporation apparatus.

18. The SAGD processing facility of claim 17, wherein the water treatment process block is configured to remove contaminants from the de-oiled water in the mechanical vapor recompression evaporation apparatus.

19. The SAGD processing facility of claim 1, wherein the steam generation process block does not comprise a once through steam generator (OTSG).

20. The SAGD processing facility of claim 1, wherein each of the plurality of modules in each of the oil/water separation process block, the de-oiling process block, the water treatment process block, and the steam generation process block comprises an equipment module and a pipeway module.

21. The SAGD processing facility of claim 20, wherein the pipeway module is located above the equipment module.

22. The SAGD processing facility of claim 1, wherein each of the oil/water separation process block, the de-oiling process block, the water treatment process block, and the steam generation process block comprises a drain system below a floor level of the plurality of modules and not underground.

23. The SAGD processing facility of claim 22, wherein each of the oil/water separation process block, the de-oiling process block, the water treatment process block, and the steam generation process block has an electrical and instruments (E&I) room on at least one module of the plurality of modules of each of the oil/water separation process block, the de-oiling process block, the water treatment process block, and the steam generation process block.

24. The SAGD processing facility of claim 23, wherein the E&I room of each of the oil/water separation process block, the de-oiling process block, the water treatment process block, and the steam generation process block is in communication with a central control room, wherein the communication is not underground.

25. The SAGD processing facility of claim 24, further comprising:
a common pipeway comprising a plurality of pipes,
wherein the pipeway module of the plurality of modules of each of the oil/water separation process block, the de-oiling process block, the water treatment process block, and the steam generation process block is fluidly connected to at least one of the plurality of pipes in the common pipeway.

* * * * *